US008675013B1

(12) United States Patent
Romaszewicz et al.

(10) Patent No.: US 8,675,013 B1
(45) Date of Patent: Mar. 18, 2014

(54) RENDERING SPHERICAL SPACE PRIMITIVES IN A CARTESIAN COORDINATE SYSTEM

(75) Inventors: Marcin Romaszewicz, Mountain View, CA (US); Gokul Varadhan, San Francisco, CA (US); Emil Praun, Fremont, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 13/162,237

(22) Filed: Jun. 16, 2011

(51) Int. Cl.
*G09G 5/00* (2006.01)

(52) U.S. Cl.
USPC .......................................... 345/623; 345/622

(58) Field of Classification Search
USPC ......... 345/582, 427, 428, 629, 630, 632, 633, 345/634, 641, 583, 585
See application file for complete search history.

(56) References Cited

U.S. PATENT DOCUMENTS

| | | | | |
|---|---|---|---|---|
| 5,652,717 A | * | 7/1997 | Miller et al. | 703/6 |
| 5,694,531 A | * | 12/1997 | Golin et al. | 345/419 |
| 6,476,813 B1 | * | 11/2002 | Hansen | 345/427 |
| 6,759,979 B2 | * | 7/2004 | Vashisth et al. | 342/357.31 |
| 7,692,576 B2 | * | 4/2010 | Mainds et al. | 342/185 |
| 7,777,647 B2 | * | 8/2010 | Sallier et al. | 340/978 |
| 2005/0128211 A1 | * | 6/2005 | Berger et al. | 345/582 |
| 2009/0256840 A1 | * | 10/2009 | Varadhan et al. | 345/419 |

* cited by examiner

*Primary Examiner* — Xiao M. Wu
*Assistant Examiner* — Steven Elbinger
(74) *Attorney, Agent, or Firm* — Dority & Manning, P.A.

(57) ABSTRACT

Embodiments render polygonal data in a geographical information systems according to a viewing perspective of a geographical information systems user. The user may define a viewing perspective. A bounding box may be determined that includes the area being viewed in the viewing perspective. A spherical coordinate to Cartesian coordinate matrix may be determined to approximately convert spherical coordinates of the polygonal data to Cartesian coordinates to be rendered by a graphics processor. The graphics processor may then render the polygonal data and bias detail towards the viewing perspective of the user.

17 Claims, 5 Drawing Sheets

Figure 2:
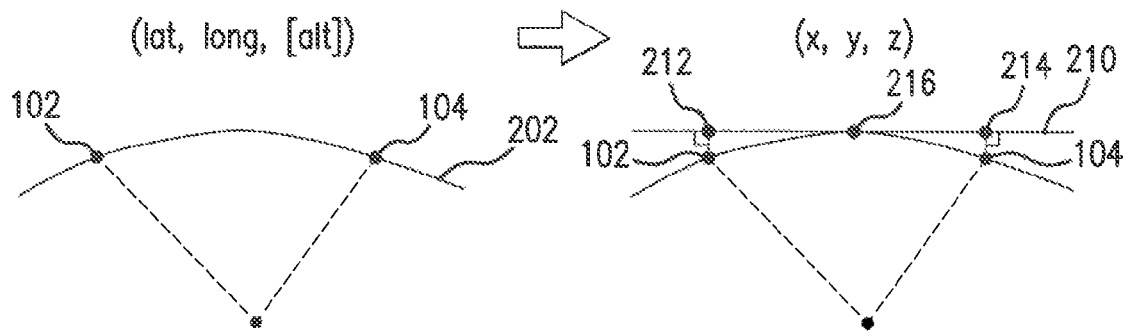

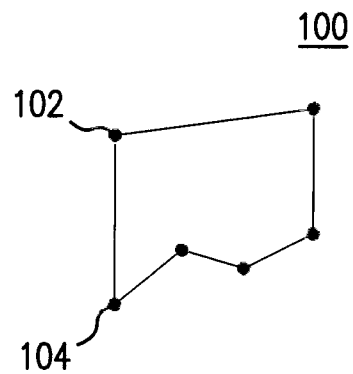
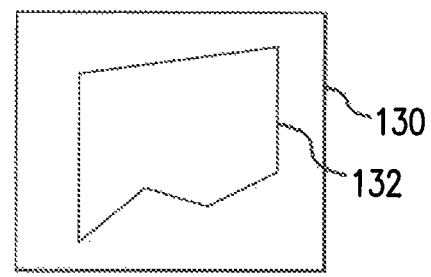
FIG.1A    FIG.1B
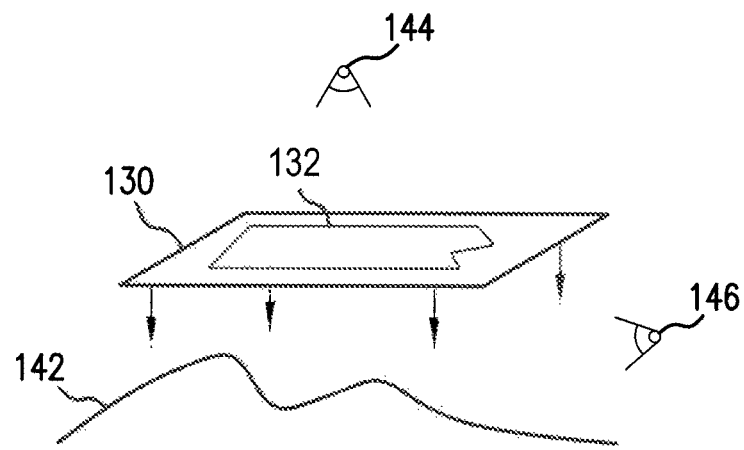
FIG.1C

US 8,675,013 B1

RENDERING SPHERICAL SPACE PRIMITIVES IN A CARTESIAN COORDINATE SYSTEM

BACKGROUND

1. Field

Embodiments relate to rendering of polygonal data.

2. Background

Geographical information systems exist that allow users to view various locations around the Earth. The geographical information system may display aerial or satellite imagery texture-mapped to the surface of the Earth to create an accurate three-dimensional rendering of the portion of the Earth being viewed. Users may zoom in or view other locations as desired. Users may also add data to be displayed along with the texture-mapped imagery.

BRIEF SUMMARY

According to an embodiment, a computer-implemented method for rendering a two-dimensional primitive shape to overlay a substantially spherical three-dimensional model is disclosed. The two-dimensional primitive shape may be specified by a plurality of spherical coordinates in a spherical coordinate system. A desired view frustum in a geographical information system is received. A bounding box including an area on the surface of a sphere occupied by the two-dimensional primitive shape is determined. The bounding box is determined according to a perspective of the desired view frustum that defines the perspective at which the substantially spherical three-dimensional model is displayed to a user. The bounding box also includes terrain of the substantially spherical three-dimensional model. A spherical coordinate to Cartesian coordinate matrix is computed, which expresses the bounding box according to the perspective of the desired view frustum. The two-dimensional primitive shape is visible in the bounding box, and the spherical coordinate to Cartesian coordinate matrix determines a virtual plane tangent to the sphere at a point on the sphere corresponding to the center of the bounding box. For each spherical coordinate in the plurality of coordinates, a corresponding Cartesian coordinate specifying a position on the virtual plane using the spherical coordinate to Cartesian coordinate matrix is computed. The plurality of Cartesian coordinates for the two-dimensional primitive shape is rendered into a texture image according to the perspective of the desired view frustum. The texture image includes more detail of the primitive shape for portions of the primitive shape closer to the viewing perspective than for portions of the primitive shape more distant from the viewing perspective. The texture image is then overlaid onto the substantially spherical three-dimensional model for display with the three-dimensional model rendered according to the viewing perspective.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

Figure 3:
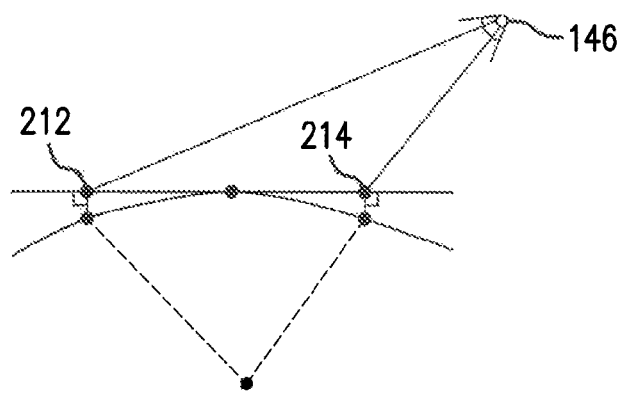
Figure 4:
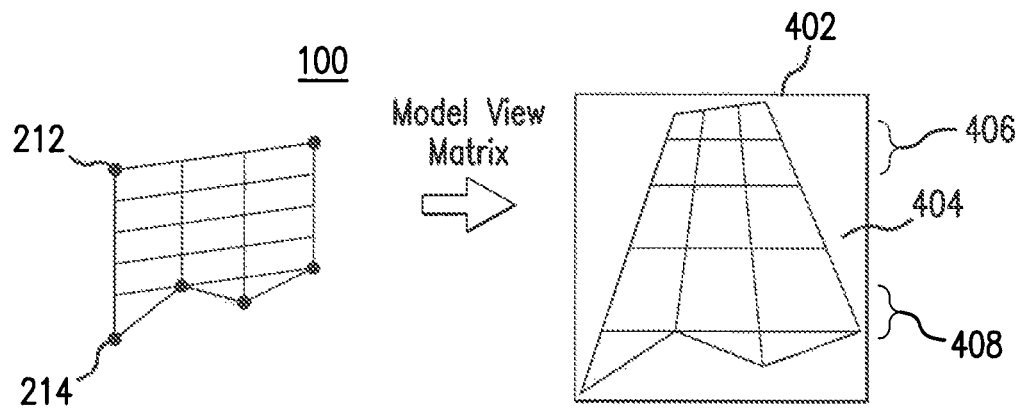
Figure 5:
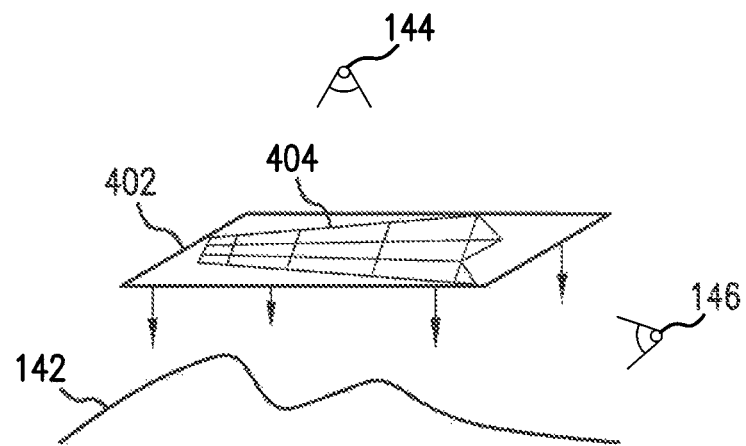
Figure 6:
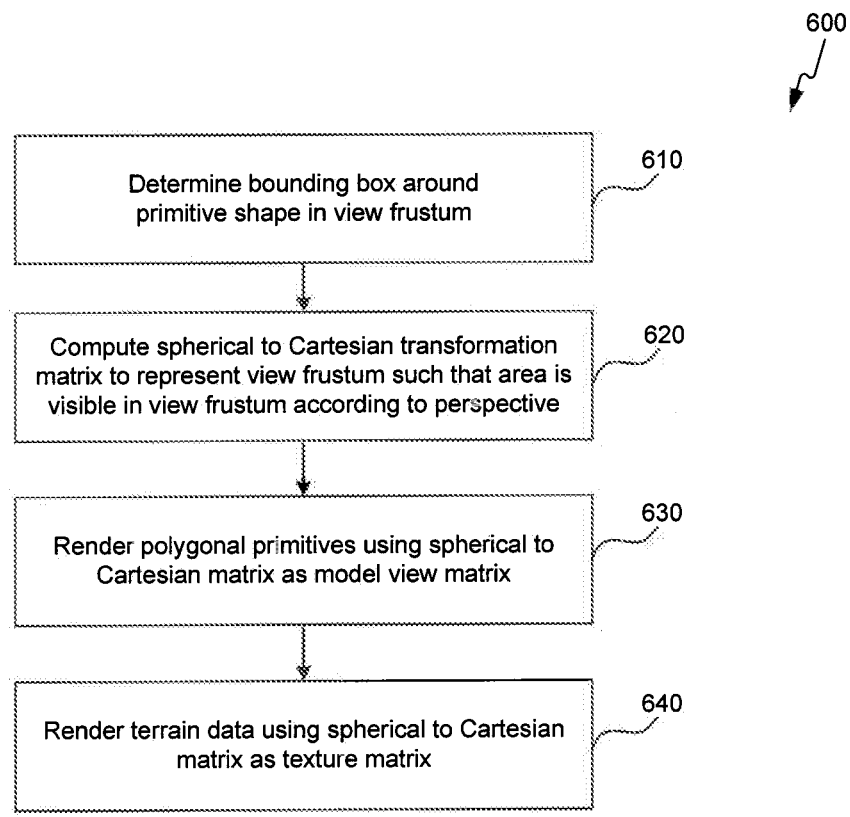
Figure 7:
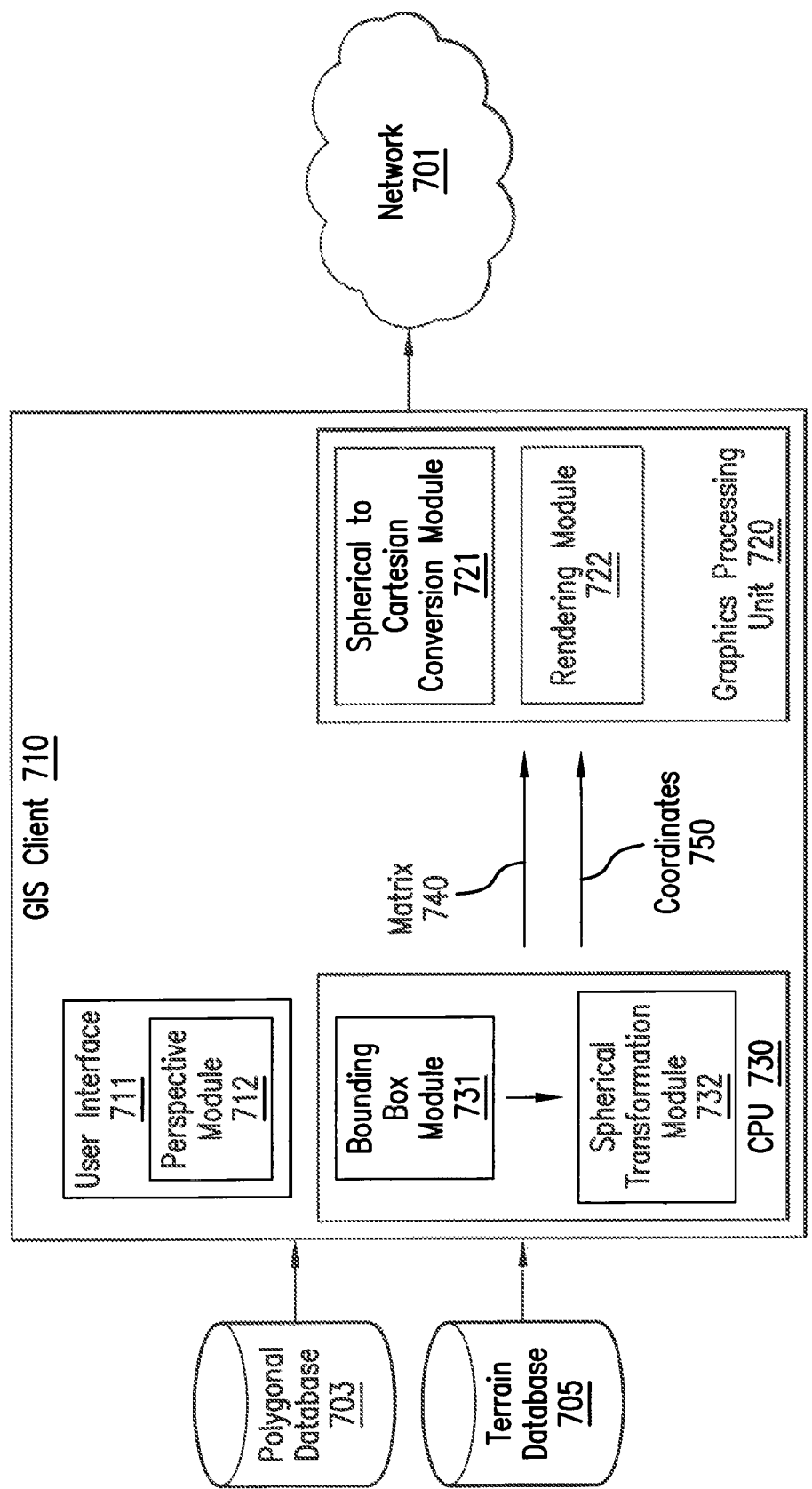

FIG. 1A is an exemplary polygon.
FIG. 1B is an exemplary polygon in a texture map.
FIG. 1C is a representation of a rendering of a texture map.
FIG. 2 is a diagram of an exemplary coordinate conversion.
FIG. 3 is a diagram of an exemplary view.
FIG. 4 is an exemplary process of converting a polygon to a texture map.
FIG. 5 is a representation of an exemplary rendering of a texture map.
FIG. 6 is a flow diagram of an exemplary method.
FIG. 7 is a diagram of an exemplary system.

DETAILED DESCRIPTION

Embodiments relate to rendering polygonal data in a geographical information system. Polygonal data may be rendered such that greater detail of the polygonal data may be included closer to the eye of a virtual viewer, while lesser detail of the polygonal data may be included farther from the eye of the virtual viewer.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Introduction

Geographic information systems (GIS) provide users with representations or renderings of various locations around the Earth, and data related to those locations. Data may be related to features of the land at the location, such as streets, buildings, trees, or other features.

In a geographical information system, polygonal data may be used for a variety of purposes. For example, polygonal data may be used to overlay the outline of counties in various states of the United States over a virtual representation of the earth. Similarly, polygonal data may be used by a real estate title company to overlay the boundaries of publicly available lot data over a representation of a city block. Such polygonal data may be provided by a user of the geographical information system or by the provider of such a geographical information system.

Vertices defining each polygon in the polygonal data may be represented as latitude, longitude, and altitude coordinates. Latitude, longitude, and altitude coordinates may correspond to spherical coordinates, as they represent a location on a sphere such as the Earth. Typically, polygons may be rendered in a geographical information system using an overhead orthographic projection. Thus, polygons may be rendered into a texture map as if they were to be viewed overhead. To render the polygons, the latitude and longitude coordinates may be converted to Cartesian coordinates. The texture map may then be overlaid onto terrain data, such as the surface of the Earth. Overlaying may also be referred to as draping the texture map over the surface of the Earth.

However, this approach may have drawbacks. Rendering a set of polygons in a square bounding box, and overlaying the square over a spherical surface such as the earth may cause portions of the square to become stretched. If a user is attempting to view a small portion of the texture map that has been draped, the portion of the texture map may be blown up very large and appear blocky. This may be because the texture map is rendered with a particular fixed number of pixels, and zooming in or focusing on a small portion of the texture map does not change the number of pixels used to render the area being viewed.

As described above, a polygon as used herein may have two or more vertices that define the boundaries of such a polygon. An example of a polygon may be seen in FIG. 1A. The polygon of FIG. 1A has, for example, vertices 102 and 104.

To overlay a polygon in a geographical information system, the polygon may be mapped to a texture. FIG. 1B is an exemplary texture-mapped polygon 132 rendered in a texture 130. Polygon 132 is rendered in texture 130 as an overhead orthographic projection.

To allow a user to view the polygonal data in a geographical information system, the texture-mapped polygon may be overlaid on the surface of a portion of the Earth being viewed by the user. As seen in FIG. 1C, for example, texture-mapped polygon 132 contained in texture 130 is overlaid onto surface 142. Cameras 144 and 146 may represent virtual cameras in a geographic information system that may define a user's view. As texture 130 is an overhead orthographic projection, as described above, when viewed from overhead, for example, from virtual camera 144, the detail of the polygonal data overlaid on the surface may be consistent throughout the polygon. Accordingly, the same number of pixels may be used to render each portion of the texture.

However, because the same number of pixels is used for each portion of the texture, when viewing the texture from virtual camera 146, for example, details closer to the virtual camera may appear blocky or pixelated. Thus, even though the farther edge of the polygon is not close to the viewer's eye or the virtual camera, it requires the same number of pixels to render.

The same situation may occur if multiple polygons are contained within the texture map. The multiple polygons may be rendered into a texture map with a fixed number of pixels, and then draped over the surface or terrain of the Earth. If a virtual camera is zoomed in to view one portion of the texture map, such as one polygon in the set of multiple polygons, that polygon may appear blocky, since only a relatively small number of pixels was used to render that portion of the image.

In such a situation, pixels may be wasted, because too few pixels may be used to represent objects closer to the virtual camera, while too many pixels may be used to represent objects farther from the virtual camera where detail may not be necessary. Thus, concentrating pixels closer to the viewer may be desirable. Accordingly, fewer pixels may be used to render objects farther from the viewer or virtual camera. Such an approach may be possible with a perspective transformation and rendering polygons according to perspective information.

Perspective Transformation

A perspective transformation may require converting spherical coordinates to a Cartesian coordinate system. Data in a geographical information system may be stored in a spherical coordinate system which specifies a latitude, longitude, and altitude for each data point. For example, vertex 102 may be defined by a latitude, longitude, and altitude value.

To render spherical coordinates, a computer processing unit may need to convert spherical coordinates into Cartesian coordinates with an X, Y, and Z value. Polygonal data or primitive shape data in a geographical information system may include millions of points. Converting these points from spherical coordinates to Cartesian coordinates on a computer processing unit for rendering may be expensive in terms of computer processing time and additional memory required to store converted or transformed coordinates. Once the coordinates are converted, however, Cartesian coordinates can then be rendered by a graphics processing unit into a texture map and draped over the surface of the Earth.

A linear transformation may be used to approximate the spherical to Cartesian coordinate transformation using one or more matrices. For example, consider a two-dimensional square that is to be overlaid on a round sphere. The coordinates of the sphere and the two-dimensional square may perfectly match at the point at which the two-dimensional square touches the sphere. Coordinates for points that are located away from the point at which the square touches the sphere will exhibit an amount of estimation error and will be less accurate at the edges of the square.

The square may represent the current area being viewed by a user, such as a bounding box, in a geographical information system. The center of the square, or where the square touches the sphere, may be the focal point of the user's view, such that in a linear approximation, the accuracy is the greatest at the user's focal point. The accuracy may be less at the areas outside the focus of the user, but since a user is likely not interested in those areas, the accuracy and detail may not be necessary.

Linearizing spherical space using an approximation may be used to increase detail for polygons or primitive shapes to be rendered by considering perspective information of the virtual camera. Polygons to be rendered may be contained in a bounding box on a sphere (i.e., the Earth). That is, a currently viewed area in a geographical information system may be represented by a bounding box. When viewing the sphere, the bounding box appears as a patch, such as a two-dimensional square, on the surface of the sphere. A transformation may create a plane to represent the bounding box and may include perspective information in the transformation. For example, the perspective information may include the angle at which the virtual camera is located. The plane may be the same size as the bounding box, and may touch the sphere at the center of the plane, or the apex point.

To render the polygons, a graphics processing unit may need to transform each vertex of each primitive shape contained within the bounding box. The transformation may perform accurately at the apex point and perform less accurately at the edges of the bounding box. The transformation may approximate the two-dimensional square touching the surface of a sphere as described above. The linear transformation may be expressed, as stated above, as one or more matrices.

The linear transformation matrix or matrices then may be provided to a graphics processing unit. The graphics processing unit can use the linear transformation to transform the spherical coordinates of the polygonal or other data to Cartesian coordinates. The result of the transformation may allow spherical data, including spherical coordinates, to be sent directly to a graphics processing unit, which may allow rendering of polygons in a perspective projection.

Such a transformation may be used to increase the detail of polygonal data in a geographical information system. When a three-dimensional view of the Earth is rendered in a geographical information system, a perspective transformation may be used, which contains a certain field of view computed from the viewing angle and the portion of the Earth being viewed. All locations on the Earth may be rendered using a perspective transformation, which may bias detail towards the eye.

Polygons may be rendered using a similar perspective transformation such that the polygonal detail may be biased towards the eye in the same way as detail visible on the Earth.

To render polygons using a perspective view, a spherical coordinate to Cartesian coordinate matrix as described herein may be applied to the model view stack of a graphics card. The model view stack of a graphics card may instruct the graphics card to transform an object or objects. To ensure that all polygons are in view in a geographical information system, the edges of the bounding box on the sphere containing all polygons may be transformed through the spherical to Cartesian coordinate conversion. The edges may then be transformed through the perspective transformation used to render the Earth. If the transformed points on the edges go outside of the screen, the field of view in the perspective transformation may be increased until the edges are contained on the screen.

Once the computations are complete, polygons may be rendered to the screen using the modified perspective projection. The contents of the current view may be read into a texture map. The spherical to Cartesian conversion may then be used as a texture matrix to render the texture overlaid on the Earth to tender the final polygons.

FIG. 2 is a diagram of an exemplary spherical to Cartesian coordinate conversion. When using a geographical information system, a spherical coordinate system may represent the latitude, longitude, and altitude of a given location. Depending on the geographical information system, the altitude value may not be used. Points 102 and 104 may be the points of polygon 100 on the Earth's surface 202 represented by coordinates in a spherical coordinate system.

Cartesian coordinates may represent a horizontal (x), vertical (y) and altitude (z) value. An approximate conversion may be performed. To convert spherical coordinates to Cartesian coordinates, a tangent plane may be overlaid on the spherical surface, such as the Earth's surface. The tangent plane may represent a texture map that would overlay the Earth's surface. The texture map may include polygonal data to be rendered. For example, tangent plane 210 may touch the Earth's surface at point 216. Point 212 may approximate point 102 in a Cartesian coordinate system, while point 214 may approximate point 104 in a Cartesian coordinate system.

FIG. 3 is a diagram of an exemplary view frustum that originates at camera 146. The view frustum may take the shape of a triangle or pyramid that terminates at points 212 and 214. Tangent plane 210 of FIG. 2 may represent a texture overlaid on the surface of the Earth. In accordance with embodiments, more detail may be available at point 214 than point 212, as point 214 may be closer to the virtual camera. In this way, embodiments allow more detail of portions of an overlaid texture closer to the virtual camera.

FIG. 4 is an example of a rendering of polygonal data according to embodiments for the same polygon of FIG. 1. As explained above, a perspective transformation may be used to bias detail towards the eye. The user's current view may be considered when rendering the polygon into a texture map. Thus, when rendering polygon 404 in texture map 402, the position and angle of virtual camera 146 in FIG. 5 may be taken into account. A perspective transformation matrix may be used to bias the polygonal data such that more pixels are used to render detail closer to the virtual camera, and fewer pixels are used to render detail farther from the virtual camera.

Thus, the polygon 404 rendered in texture map 402 may have greater detail in the portion of the texture map 402 closer to virtual camera 146, such as portion 408. Lesser detail may be included in the portion of texture map 402 farther from the virtual camera 146, such as portion 406. The texture map including the polygon may then be overlaid on the Earth's surface 142. Because a perspective transformation was used in rendering polygon 100, detail of polygon 100 contained in texture 402 may be biased towards camera 146, such that points of the polygon closer to camera 146 are represented with more pixels and thus greater detail. In embodiments, converting the spherical coordinates to Cartesian coordinates may take place with the assistance of a matrix.

Method

FIG. 6 is a flow diagram of an exemplary method 600 for rendering polygonal data in a geographical information system. Method 600 begins at step 610.

At step 610, a bounding box in a spherical space around a primitive shape or shapes to be viewed in a view frustum is determined. The bounding box may include an area on the surface of a sphere occupied by the primitive shape or shapes. The view frustum may be defined by a user viewing a portion of the Earth in a geographical information system client. The sphere with a radius may represent the Earth. The primitive shape may be one or more polygons defined by vertices.

At step 620, a spherical coordinate to Cartesian coordinate matrix is computed to represent the view frustum, such that the area of the view frustum is visible according to the perspective of the viewer. The spherical coordinate to Cartesian coordinate matrix may determine a virtual plane tangent to the sphere at a point on the sphere corresponding to the center of the bounding box. That is, the matrix is computed such that the spherical to Cartesian conversion takes into account the camera angle and other perspective information of the view frustum. The spherical to Cartesian matrix may be computed by a processor, such as a central processing unit of a GIS client.

At step 630, the polygonal primitive shapes are rendered using the spherical coordinate to Cartesian coordinate matrix as the model view matrix. Each of the spherical coordinates representing the two-dimensional primitive shape are converted to Cartesian coordinates using the spherical coordinate to Cartesian coordinate matrix. That is, the primitive shapes, or polygonal data, may be rendered in a texture map such that the detail is biased towards the camera or the user's eye view. Primitive shapes may be rendered by a graphics processing unit of a GIS client.

At step 640, terrain data for the current area being viewed by a user is rendered. Terrain data may include terrain Cartesian coordinates which are rendered into a texture map. Additionally, terrain spherical coordinates which correspond to the terrain Cartesian coordinates are textured into the texture map rendered in step 630 using the spherical coordinate to Cartesian coordinate matrix generated in step 620. That is, the spherical coordinate to Cartesian coordinate matrix may be used as the texture matrix. Thus, the terrain data is also rendered to bias detail towards the eye. Because the primitive shapes and the terrain data are rendered using the same matrix, the coordinates transformed by the spherical coordinate to Cartesian coordinate matrix correlate such that the rendered polygons correlate to the rendered terrain. The terrain data may also be rendered by a graphics processing unit of a GIS client.

The rendered primitive shapes and terrain data may then be viewed by a virtual camera in a geographical information systems client.

System

FIG. 7 is a diagram of a system 700 including a GIS client 710 that may be used to implement embodiments described herein.

Geographical information systems client 710 may receive data from polygonal database 703. Polygonal database 703 may contain polygons and associated data as described herein, for various applications such as real estate lot detail.

GIS client 710 may also receive data from terrain database 705. Terrain database 705 may store multiple levels of detail for various sections of the Earth's surface.

Each of polygonal database 703 and terrain database 705 may be implemented in any type of structured memory, including a persistent memory. In examples, each database may be implemented as a relational or non-relational database.

GIS client 710 includes user interface 711. User interface 711 may allow a user to specify a location on the Earth to be viewed, and allow a user to zoom in or out on various locations. User interface 711 may include perspective module 712, which defines the perspective information of the user's current view. For example, perspective module 712 may include the angle of the virtual camera and the distance from the Earth's surface.

GIS client 710 also includes computer processing unit 730. Computer processing unit 730 may be a general purpose or special purpose processor. CPU 730 may include or be provided with instructions that instruct it to operate as a bounding box module 731 to determine the coordinates of a bounding box being viewed by a user. CPU 730 may also include a spherical transformation module 732, which determines a matrix transformation that can convert spherical coordinates into a Cartesian coordinate space, according to the perspective view of the user.

The matrix transformation determined by spherical transformation module 732 may be provided as matrix 740 to graphics processing unit 720. Further, coordinates 750 of the polygons and the bounding box determined by CPU 730 may also be provided to GPU 720.

GPU 720 may also be a general purpose processor, or a special purpose processor on a graphics card or video card of a computing device. GPU 720 may, upon receiving matrix 740 and coordinates 750, convert the polygon coordinates 750 from a spherical coordinate space to a Cartesian coordinate space using spherical to Cartesian conversion module 721. In accordance with step 630 of method 600, once the coordinates have been converted, the matrix may be used as the model view matrix to render the polygon shapes by rendering module 722. Spherical to Cartesian conversion module 721 of graphics processing unit 720 may further convert spherical coordinates of terrain data from terrain database 705 to Cartesian coordinates, using matrix 740, and render the terrain data using rendering module 722.

Geographical information systems client 710 may also be connected to a network 701, such as a local area network, medium area network, or wide area network such as the Internet. In an embodiment, polygonal database 703 or terrain database 705 may be accessed via network 701.

Each of the modules shown in geographical information systems client 710 may be implemented in hardware, software, firmware, or any combination thereof. Software may include one or more applications and an operating system. Hardware can include, but is not limited to, a processor, memory and graphical user interface display. Geographical information systems client 710 may also have multiple processors and multiple shared or separate memory components. For example, modules of geographical information systems client 710 may be implemented on a clustered computing environment or server farm.

CONCLUSION

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for rendering a two-dimensional primitive shape to overlay a substantially spherical three-dimensional model, the two-dimensional primitive shape specified by a plurality of spherical coordinates in a spherical coordinate system, comprising:

(a) receiving a desired view frustum in a geographical information system;

(b) determining a bounding box comprising an area on a surface of a sphere occupied by the two-dimensional primitive shape, according to a perspective of the desired view frustum that defines a viewing perspective at which the substantially spherical three-dimensional model is displayed to a user, and wherein the bounding box further includes terrain of the substantially spherical three-dimensional model;

(c) computing a spherical coordinate to Cartesian coordinate matrix which expresses the bounding box according to the perspective of the desired view frustum, wherein the two-dimensional primitive shape is visible in the bounding box, and wherein the spherical coordinate to Cartesian coordinate matrix determines a virtual plane tangent to the sphere at a point on the sphere corresponding to the center of the bounding box determined in (b), the spherical coordinate to Cartesian coordinate matrix enabling the plurality of spherical coordinates to be sent to a graphics processing unit;

(d) for each spherical coordinate in the plurality of spherical coordinates, computing, on the graphics processing unit using the computed matrix, a corresponding Cartesian coordinate specifying a position on the virtual plane using the spherical coordinate to Cartesian coordinate matrix;

(e) rendering the plurality of Cartesian coordinates determined in (d) for the two-dimensional primitive shape into a texture image according to the perspective of the desired view frustum, wherein the texture image includes more detail of the primitive shape for portions of the primitive shape closer to the viewing perspective than for portions of the primitive shape more distant from the viewing perspective; and (f) overlaying the texture image onto the substantially spherical three-dimensional model for display with the three-dimensional model rendered according to the viewing perspective.

2. The method of claim 1, wherein step (f) further comprises:

(i) determining a plurality of terrain spherical coordinates according to the terrain included in the bounding box determined in (b);

(ii) for each terrain spherical coordinate in the plurality of terrain spherical coordinates, computing a Cartesian coordinate specifying a position on the virtual plane using the spherical coordinate to Cartesian coordinate matrix;

(iii) rendering the plurality of Cartesian coordinates determined in (ii) for the bounding box into a terrain texture image according to the perspective of the desired view frustum, wherein the terrain texture image includes more detail of the terrain data for portions of the terrain data closer to the viewing perspective than for portions of the terrain data more distant from the viewing perspective;

(iv) overlaying the texture image and the terrain texture image onto the substantially spherical three-dimensional model for display with the three-dimensional model rendered according to the viewing perspective.

3. The method of claim 1, wherein step (c) is performed by a central processing unit.

4. The method of claim 1, wherein step (e) is performed by the graphics processing unit.

5. The method of claim 1, wherein step (c) is performed by a central processing unit, wherein step (e) is performed by the graphics processing unit, and wherein the graphics processing unit is different from the central processing unit.

6. The method of claim 1, further comprising receiving the two-dimensional primitive shape from a user-created database of two-dimensional primitive shapes.

7. A geographical information systems client, comprising:

a receiver that receives a two-dimensional primitive shape to be overlaid on a substantially spherical three-dimensional model, the two-dimensional primitive shape specified by a plurality of spherical coordinates in a spherical coordinate system;

a perspective module that determines perspective information corresponding to a user-desired view frustum defined by a virtual camera, wherein the perspective information defines the perspective at which the substantially spherical three-dimensional model is displayed to a user;

a processor that:

determines a bounding box comprising an area on a surface of a sphere occupied by the received two-dimensional primitive shape, according to the perspective information, and generates a spherical coordinate to Cartesian coordinate matrix which expresses the bounding box according to the perspective information, wherein the two-dimensional primitive shape is visible in the bounding box, and wherein the spherical coordinate to Cartesian coordinate matrix determines a virtual plane tangent to the sphere at a point on the sphere corresponding to the center of the bounding box, wherein the bounding box further includes terrain of the substantially spherical three-dimensional model; and a graphics processing unit that:

receives the spherical coordinate to Cartesian coordinate matrix, determines, using the generated matrix, a corresponding Cartesian coordinate for each of the plurality of spherical coordinates specifying the two-dimensional primitive shape, according to the spherical coordinate to Cartesian coordinate matrix, renders the two-dimensional shape into a texture map according to the determined corresponding Cartesian coordinates, wherein the texture map includes more detail of the two-dimensional primitive shape for portions of the two-dimensional primitive shape closer to the virtual camera according to the perspective information than for portions of the two-dimensional primitive shape more distant from the virtual camera according to the perspective information, and overlays the texture map onto the substantially spherical three-dimensional model for display with the three-dimensional model rendered according to the perspective information, wherein the spherical coordinate to Cartesian coordinate matrix enables the plurality of spherical coordinates to be sent to a graphics processing.

8. The geographical information systems client of claim 7, wherein the processor is a central processing unit.

9. The geographical information systems client of claim 8, wherein the receiver further receives a plurality of terrain spherical coordinates according, to the terrain included in the bounding box, and wherein the graphics processing unit further:

determines a corresponding terrain Cartesian coordinates for each of the plurality of terrain spherical coordinates according to the terrain data included in the bounding, box, renders the terrain included in the bounding box into a terrain texture map according to the determined terrain Cartesian coordinates, wherein the terrain texture map includes more detail of the terrain included in the bounding box for portions of the terrain included in the bounding box closer to the virtual camera according to the perspective information than for portions of the terrain included in the bounding box more distant from the virtual camera according to the perspective information, and overlays the texture map and the terrain texture map onto the substantially spherical three-dimensional model for display with the three-dimensional model rendered according to the perspective information.

10. A nontransitory computer readable storage medium having instructions stored thereon that, when executed by a processor, cause the processor to perform operations for rendering a two-dimensional primitive shape to overlay a substantially spherical three-dimensional model, the two-dimensional primitive shape specified by a plurality of spherical coordinates in a spherical coordinate system, the operations including:

(a) receiving a desired view frustum in a geographical information system;

(b) determining a bounding box comprising an area on a surface of a sphere occupied by the two-dimensional primitive shape, according to a perspective of the desired view frustum that defines a viewing perspective at which the substantially spherical three-dimensional model is displayed to a user, and wherein the bounding box further includes terrain of the substantially spherical three-dimensional model;

(c) computing a spherical coordinate to Cartesian coordinate matrix which expresses the bounding box according to the perspective of the desired view frustum, wherein the two-dimensional primitive shape is visible in the bounding box, and wherein the spherical coordinate to Cartesian coordinate matrix determines a virtual plane tangent to the sphere at a point on the sphere corresponding to the center of the bounding box determined in (b), the spherical coordinate to Cartesian coordinate matrix enabling the plurality of spherical coordinates to be sent to a graphics processing unit; and (d) sending the plurality of spherical coordinates directly to a graphics processing unit, wherein the graphics unit:

(i) for each spherical coordinate in the plurality of coordinates, computes a corresponding Cartesian coordinate specifying a position on the virtual plane using the spherical coordinate to Cartesian coordinate matrix;

(ii) renders the plurality of Cartesian coordinates determined in (d) for the two-dimensional primitive shape into a texture image according to the perspective of the desired view frustum, wherein the texture image includes more detail of the primitive shape for portions of the primitive shape closer to the viewing perspective than for portions of the primitive shape more distant from the viewing perspective; and (iii) overlays the texture image onto the substantially spherical three-dimensional model for display with the three-dimensional model rendered according to the viewing perspective.

11. The computer readable storage medium of claim 10, wherein the graphics processing unit, to overlay the texture image:

determines a plurality of terrain spherical coordinates according to the terrain included in the bounding box determined in (b);

for each terrain spherical coordinate in the plurality of terrain spherical coordinates, computes a Cartesian coordinate specifying a position on the virtual plane using the spherical coordinate to Cartesian coordinate matrix;

renders the plurality of Cartesian coordinates determined in (ii) for the bounding box into a terrain texture image according to the perspective of the desired view frustum, wherein the terrain texture image includes more detail of the terrain data for portions of the terrain data closer to the viewing perspective than for portions of the terrain data more distant from the viewing perspective; and overlays the texture image and the terrain texture image onto the substantially spherical three-dimensional model for display with the three-dimensional model rendered according to the viewing perspective.

12. The computer readable storage medium of claim 10, wherein the operations (c) are executed by a central processing unit.

13. The computer readable storage medium of claim 10, wherein step (c) is performed by a central processing unit, and wherein the graphics processing unit is different from the central processing unit.

14. The computer readable storage medium claim 10, the operations further comprising receiving the two-dimensional primitive shape from a user-created database of two-dimensional primitive shapes.

15. A computer-implemented method for rendering a two-dimensional primitive shape to overlay a substantially spherical three-dimensional model, the two-dimensional primitive shape specified by a plurality of spherical coordinates in a spherical coordinate system, comprising:

(a) receiving perspective information in a geographical information system;

(b) determining a bounding area comprising an area on a surface of a sphere occupied by the two-dimensional primitive shape, according to the perspective information that defines a viewing perspective at which the substantially spherical three-dimensional model is displayed to a user, and wherein the bounding area further includes terrain of the substantially spherical three-dimensional model;

(c) computing a spherical coordinate to Cartesian coordinate transformation which expresses the bounding area according to the perspective information, wherein the two-dimensional primitive shape is visible in the bounding box, and herein the spherical coordinate to Cartesian coordinate transformation determines a virtual plane tangent to the sphere at a point on the sphere corresponding to the center of the bounding area determined in (b), the spherical coordinate to Cartesian coordinate matrix enabling the plurality of spherical coordinates to be sent to a graphics processing unit;

(d) for each spherical coordinate in the plurality of coordinates, computing, on the graphics processing unit using the computed matrix, a corresponding Cartesian coordinate specifying a position on the virtual plane using the spherical coordinate to Cartesian coordinate transformation; and (e) rendering the plurality of Cartesian coordinates determined in (d) for the two-dimensional primitive shape into a texture image according to the perspective information, wherein the texture image includes more detail of the primitive shape for portions of the primitive shape closer to the viewing perspective than for portions of the primitive shape more distant from the viewing perspective.

16. The method of claim 15, further comprising:

(f) overlaying the texture image onto the substantially spherical three-dimensional model for display with the three-dimensional model rendered according to the viewing perspective.

17. The method of claim 15, wherein step (e) is performed by a graphics processing unit.

* * * * *

UNITED STATES PATENT AND TRADEMARK OFFICE
CERTIFICATE OF CORRECTION

| | | |
|---|---|---|
| PATENT NO. | : 8,675,013 B1 | Page 1 of 1 |
| APPLICATION NO. | : 13/162237 | |
| DATED | : March 18, 2014 | |
| INVENTOR(S) | : Romaszewicz et al. | |

It is certified that error appears in the above-identified patent and that said Letters Patent is hereby corrected as shown below:

In the Claims

Column 10, line 54 please delete "," after the word "according"

Column 10, line 59 please delete "," after the word "bounding"

Column 12, line 42 please delete the word "herein" and insert the word --wherein--

Signed and Sealed this
Second Day of December, 2014

Michelle K. Lee
*Deputy Director of the United States Patent and Trademark Office*